Figure 9:
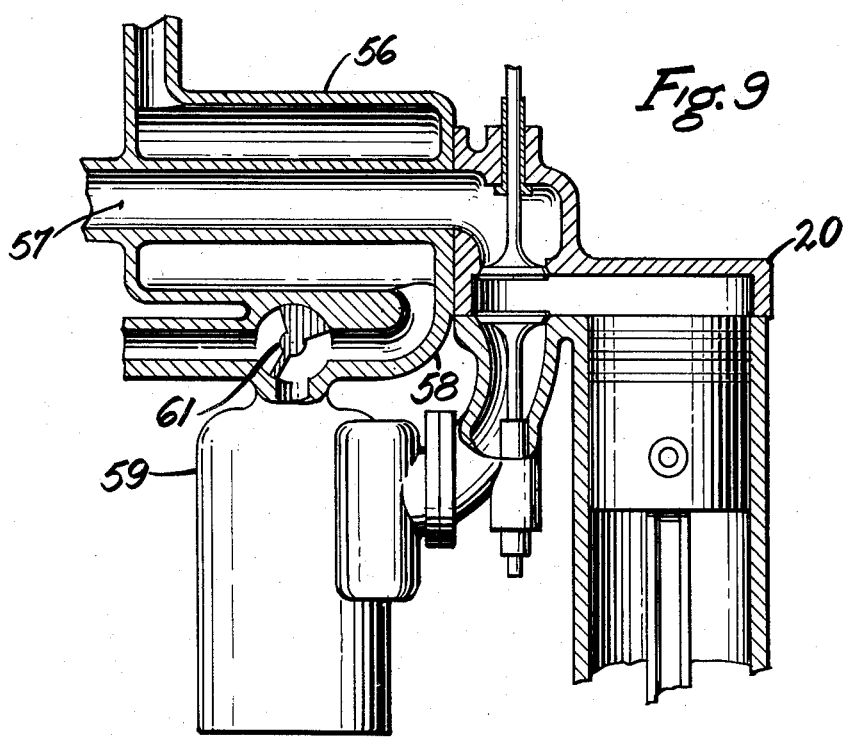

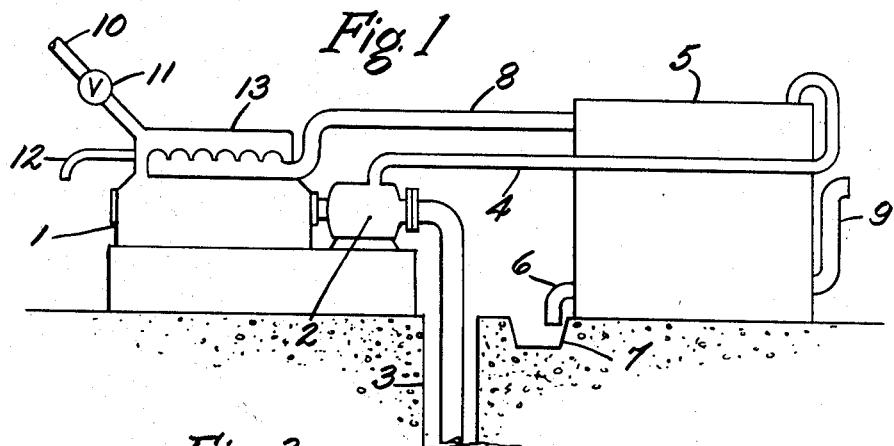
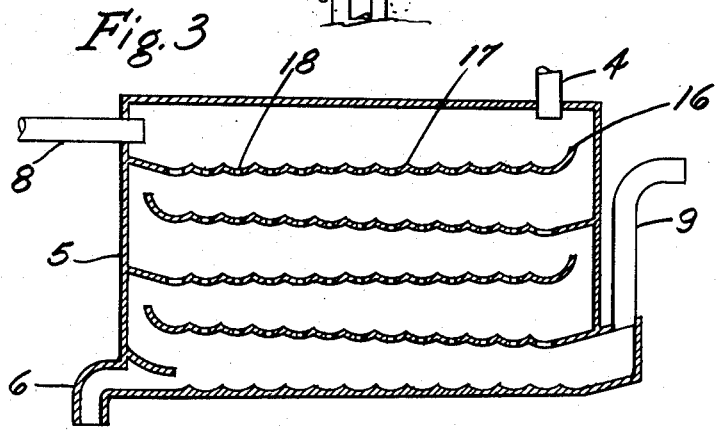
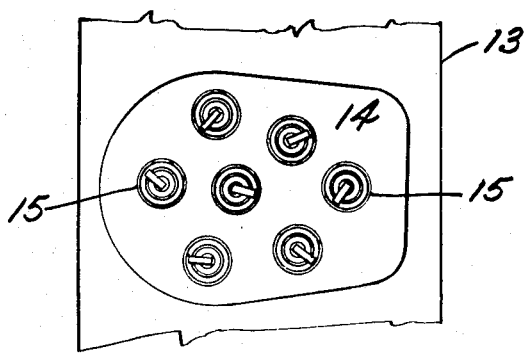

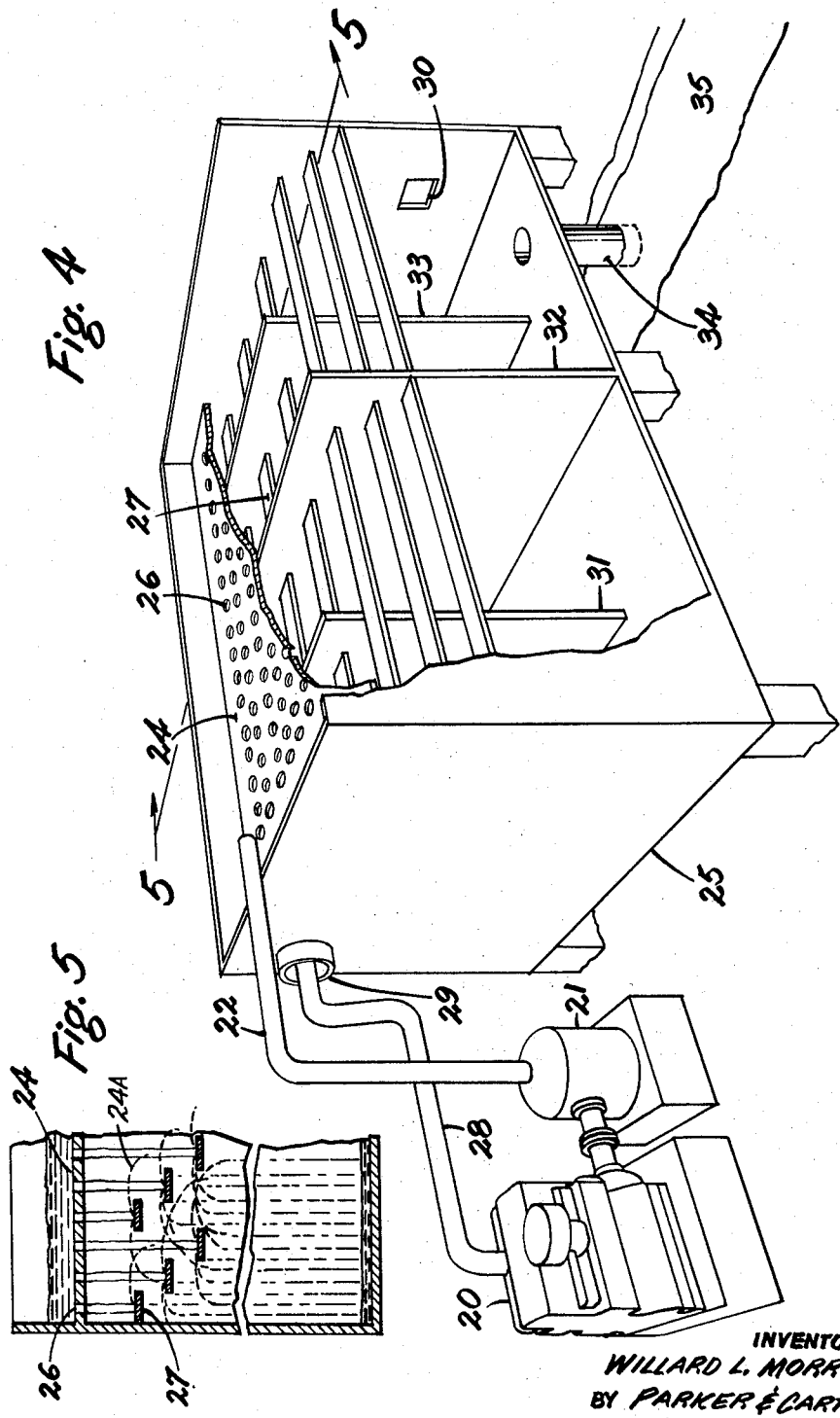

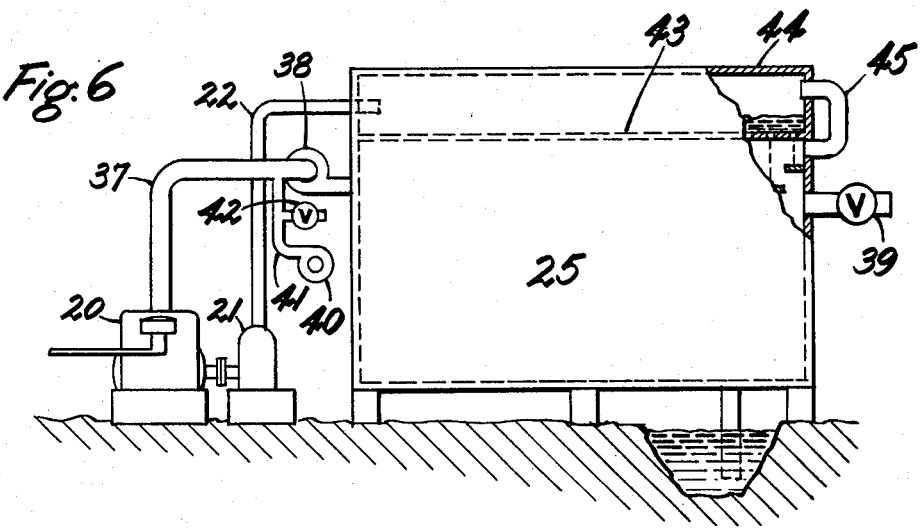
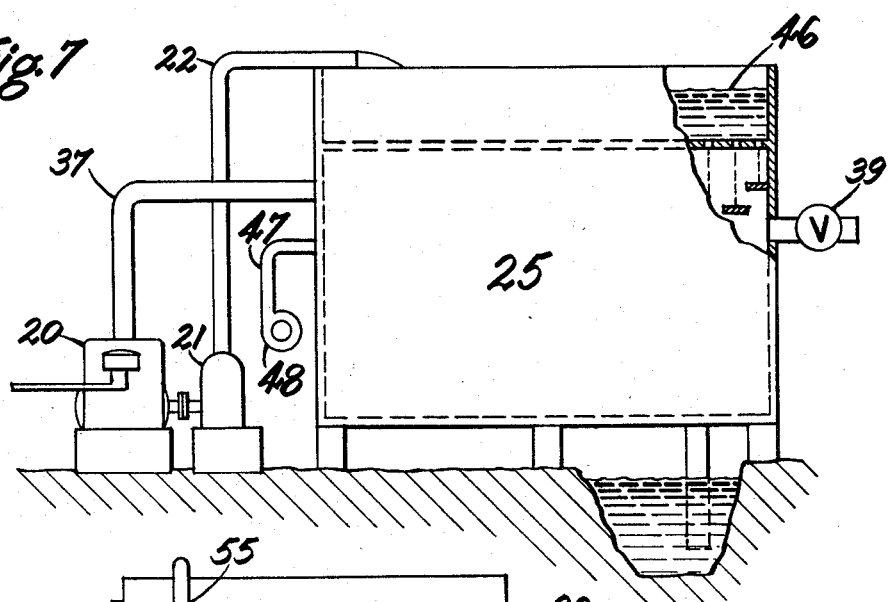
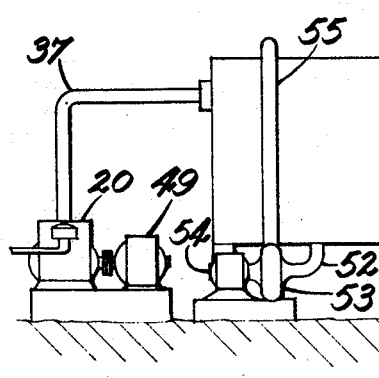
INVENTOR.
Willard L. Morrison,
BY Parker & Carter
Attorneys.

United States Patent Office

2,947,112
Patented Aug. 2, 1960

---

2,947,112

PRODUCTION, FIXATION AND USE OF NITROGENOUS COMPOUNDS

Willard L. Morrison, Lake Forest, Ill., assignor to The Union Stock Yard and Transit Company of Chicago, Chicago, Ill., a corporation of Illinois Filed Oct. 29, 1958, Ser. No. 770,512

10 Claims. (Cl. 47—58)

My invention relates to improvements in method of and apparatus for recovering and using nitrogen from the air to promote vegetable growth, and is a continuation in part of my copending application Serial No. 611,865, filed September 25, 1956.

One object of my invention is to make use of irrigation water pumped from wells or other sources and discharged on the land, as a carrier for nitrogenous compounds which will promote vegetable growth.

Another object of my invention is to make use of an irrigation system to control and distribute nitrogenous compounds to the land in consonance with the crop requirement.

Another object is to use the exhaust gases from an internal combustion engine furnishing the power to pump irrigation water, as the source of nitrogenous compounds for growing crops.

Another object is to provide a means of preheating air used in an internal combustion engine, so as to increase the yield of nitrogenous compounds from the exhaust gases of the engine.

Another object is to provide a means for cooling the exhaust gases of an internal combustion engine so as to encourage the rapid oxidation of nitric oxide (NO) in the exhaust gases to nitrogen dioxide ($NO_2$).

Another object is to provide a means for adding air containing nitrogen and oxygen to internal combustion engine exhaust gases containing nitrogenous compounds so as to promote the rapid oxidation of nitric oxide (NO) in the exhaust gases to nitrogen dioxide ($NO_2$).

Under normal operating conditions the exhaust gases of an internal combustion engine will contain various amounts of nitric oxide, the amount depending on the fuel mixture used in the engine. It has been found that the proportion of nitric oxide in the exhaust gases can be substantially increased if the intake air, drawn into the engine, is preheated, so that the temperature in the combustion chamber is raised. It has also been found that the rate of oxidation of the nitric oxide in the exhaust gases to nitrogen dioxide can be increased if the exhaust gases are cooled as they leave the engine. In my invention I both preheat the inlet air and cool the exhaust gases in one operation. By forcing the inlet air into a heat exchanger which is telescoped around the exhaust pipe, heat from the exhaust gases will be given to the inlet air, and the exhaust gases will be cooled.

Unless the temperature of the intake air is raised to, in the order of 120 degrees F. there is no appreciable increase in the nitric oxide yield. As the temperature of the air rises above that point, increased nitrogen oxygen combination results. The upper limit of the temperature is that at which one hundred percent heat exchange occurs and the intake air and exhaust gas are the same temperature. This of course cannot be obtained. The upper limit actually depends upon the particular engine design characteristics. When dealing with an engine where a combustible air fuel mixture is supplied to and compressed in the cylinder, the temperature of the mixture must be such that it does not self-ignite before the correct time of ignition, as such pre-ignition may substantially interfere with the proper operation of the engine. The actual temperature of the gas then as it goes into the engine is limited by engine operation. As load increases and temperatures rise, the heat exchange must be controlled to insure that pre-ignition does not occur. This requires exactly the same kind of adjustment and control as is required for setting the timing of any internal combustion engine. For this particular operation, it is desirable that combustion be complete at or before upper dead center of the combustion chamber so that maximum combustion temperatures with maximum fall of temperature on exhaust will be obtained. The only other adjustment needed beside the timing and the opening of the throttle to control fuel flow is an adjustment of the heat exchange to insure maximum intake temperature up to the point at which pre-ignition may occur.

Another way to increase the rate of oxidation of the nitric oxide in the exhaust gases is to add air containing oxygen and nitrogen to the exhaust gases. A convenient way to supply the additional air is by using the exhaust gases to entrain and inject the air into a closed reaction chamber.

Exhaust gas, from an internal combustion engine used to pump irrigation water contains nitric oxide which is generally considered not to be soluble in water. After such gas has been cooled by the heat exchange relationship with the inlet air, the exhaust gas is discharged into and circulates through, and is finally discharged from a converter or reaction chamber. Additional air will be caused to circulate through and be discharged from the chamber in consonance with the exhaust gas supply, and as the two gases pass through the chamber they will, as will later appear, be intimately mixed in the presence of the finely divided water which exposes a very large superficial area for contact with the gases. Both the additional air mixed with the exhaust gases and the cooling of the exhaust gases promote the oxidation of the nitric oxide to nitrogen dioxide. Nitrogen dioxide is a water soluble compound.

The irrigation water being pumped by the engine will be caused to pass through the converter or reaction chamber in a finely divided condition, for example, as rain or spray or in turbulent sheets, so that the water, flowing in the chamber will present, with respect to volume, an exceedingly large surface area to the gases flowing through the chamber. The readily soluble nitrogen dioxide or ($NO_2$) will go into solution in the water where it picks up additional oxygen. Thus the irrigation water discharged from the converter will be a very dilute solution of ($HNO_3$) which is a nitrogen compound especially adapted to feed and promote plant growth.

The weight and specific heat of the exhaust gas is so small in proportion to the weight and specific heat of the additional air in the water, that the heat of the exhaust gas can be disregarded and there will no measurable change in the water temperature.

Since the entire volume of water pumped by the engine passes through the reaction chamber and is exposed to the gases therein for a substantial period of time, a large proportion of the nitrogen or nitrogenous compounds in the exhaust gas will go into solution in the water. The $HNO_3$ resulting from this mixing will be generally uniformly distributed throughout the entire stream of water. Whenever irrigation water is pumped, it will carry with it to the plant, a generally uniform amount of the desired nitrogenous compound. The $HNO_3$ will always be presented to the plants in a concentration that is particularly well adapted to promote plant growth. Such a supply of HNO₃ to the land will only take place when irrigation water is pumped.

Of particular note in my invention is the novel way that I have increased the nitrogenous compound yield of the exhaust gases, and at the same time have reduced the temperature of these gases to promote the oxidation of the nitric oxide to nitrogen dioxide. Also I have added additional air to help promote the oxidation process. The water soluble nitrogen dioxide then mixes with the fine sheets or spray of water to form HNO₃ which provides fertilization for the plants.

My invention is illustrated more or less in the accompanying drawings, wherein:

Figure 1 is a schematic showing of my invention,

Figure 2 is a bottom plan view of an engine cylinder head modified to use my invention, Figure 3 is a section through the extraction chamber, Figure 4 is a diagrammatic perspective of a modified form, Figure 5 is a detailed section along the line 5—5 of Figure 4, Figure 6 is a diagrammatic side elevation in part section to show a further modification, Figure 7 is a diagrammatic side elevation in part section showing another modified form, Figure 8 is a diagrammatic side elevation of another modified form, and Figure 9 is a perspective view of an internal combustion engine modified in accordance with my invention.

Like parts are indicated by like characters throughout the specification and drawings.

An internal combustion engine 1 drives pump 2 which draws water from a well 3 or other suitable water supply source, and discharges the water through pipe 4 to an extraction chamber 5. The water from the extraction chamber is discharged through pipe 6 to an irrigation channel 7. The engine exhaust gases pass through pipe 8 to the chamber 5 and then are discharged to the atmosphere through an exhaust pipe 9.

Cooling liquid reaches the engine through a pipe 10 controlled by a valve 11 and is discharged through another pipe 12. An engine cylinder head 13 has a combustion chamber 14 for each cylinder, there being a multiplicity of spark plugs 15, for example, seven, spaced about the chamber. Other engine details being conventional are not illustrated.

The extraction chamber functions to insure the relatively long intimate contact between the water in the exhaust gases so that the maximum amount of nitrogenous compounds will be extracted from the gas. The water discharged by the pump 2 enters the chamber 5 at the top, flows laterally across the inclined tables 16 which are corrugated at 17, and perforated at 18, so as to provide a tortuous path for the water sheet as it flows downwardly to discharge at 6. The engine exhaust travels a generally tortuous path which may be generally in counter current or reverse as the case may be, to the water between the table 16 in contact with the thin sheets of water traveling thereon and with the sprays discharged from table to table by the perforations 18 therein. Corrugations 17 tend to agitate and break up the water sheets to promote further contact between gas and water.

The coolant for the engine may come from any suitable source, such as a pump circulating water to a radiator or the water pumped from the well or any other desired means, the specific details of which form no part of the present invention and are not illustrated. The important thing is that the valve 11 makes it possible to control the rate at which the coolant circulates so as to control the temperature in the engine and so ensure that the temperature in the combustion chamber will be at the high point.

In the modified forms shown in Figures 4 through 8, an internal combustion engine 20 drives a pump 21. Water is discharged by the pump 21 through duct 22 to a water tray 24 in the top of a nitrogen conversion chamber 25.

The floor of the tray 24 has been perforated as at 26, so that water will trickle or flow down through the floor and into the chamber. The perforations 26 are arranged above cross slats 27 so that, as shown in Figure 5, the water that falls through the perforations will bounce on and be deflected by the slats so as to fill or substantially fill the chamber with a continuously moving mass of water droplets 24A. These water droplets will be exposed to the exhaust gas from the engine 20 entering the chamber 25 below the water tray 24 through exhaust pipe 28 and inductor 29. When the exhaust gas comes through the exhaust pipe 28 and the inductor 29 it will induce and draw with it an additional supply of air containing oxygen and nitrogen. This mixed gas will pass labyrinthwise through the chamber and be discharged at 30. Partitions 31, 32, and 33 constrain the gas to a tortuous path back and forth in intimate contact with the finely divided water droplets. The water droplets will flow out through the water discharge pipe 34 to a conduit or irrigation ditch 35 and on to any desired disposal. It will be noted that the water tray is open to the atmosphere. A sufficient amount of water should always be pumped into the tray to insure it is full and that the apertures 26 conduct water from the tray to the interior of the conversion chamber.

Thus the air is being constantly mixed and commingling in the presence of the very fine water spray in the spray chamber so that a continuous reaction between the water, the oxygen and the nitrogen may continuously take place as the gases and the water and water vapor travel through the reaction chamber, the mixing of the gases taking place always in the presence of the water. Because the water is exceedingly finely divided a tremendous water surface is exposed to the gases so that a maximum absorption of the gas in the water and oxidation of the nitrogen can take place.

In the modified form shown in Figure 6, an engine 20 discharges the exhaust gas through a duct 37 to a compressor 38, which in turn discharges the exhaust gas into a chamber 25. The compressor, which may be operated by any suitable source of power, places the gas in the chamber under pressure. The pressure may be controlled by operation of the compressor 38 and also by manipulation of a discharge valve 39. An air compressor 40, which also may be moved by a suitable source of power, injects air through a duct 41 to the pipe 37. A valve 42 permits entrance of air to the pipe 41 so that it may be induced by the gas into the duct 37 independent of the compressor 40. In this case, the water tray 43 is closed at 44 and connected by a U-shaped pipe 45 with the interior of the chamber 25 so that the water pressure may be maintained at a sufficiently high level to insure continued down flow of the water against the increased gas pressure of the chamber.

In the modification of Figure 7, a deep layer of water is shown over the tray at 46. Additional air is discharged directly into the chamber independent of the exhaust gas by means of duct 47 which conducts air from a pump 48.

In the modified form of Figure 8, a different use of my invention is shown wherein the engine 20 may have a load 49 other than a pump. The exhaust gas from the engine 20 is discharged directly to a chamber 25. Water is supplied to the chamber through a valve controlled duct 50, the water circulating in the manner described above. The water with the nitrogen compound absorbed will discharge through a valve control duct 51. In this case the water in the chamber recirculates, it being drawn from the bottom of the chamber through the duct 52, discharged by a pump 53, which is driven by a suitable power source 54. The water is then discharged through the duct 55 for recirculation through the chamber where the water is exposed for a substantial length of time to several parts of the conversion chamber to increase the nitrogen content.

In Figure 9, a modified form of the engine 20 is shown in which a heat exchanger indicated at 56 surrounds the exhaust pipe 57. The intake air drawn into the heat exchanger will come in contact with the hot exhaust pipe with a subsequent rise in temperature of the intake air. The heated intake air is then conducted through the pipe 58, into the oil bath 59, and then into the engine 20. The inlet pipe 58 is provided with a valve 61, so that air may be drawn to the oil bath from either the outside or from the heat exchanger.

The heat exchanger has two purposes, it will heat the intake air and at the same time cool the exhaust gases as they give up their heat to the intake air. This has the double effect of both preheating the intake air to increase the amount of nitric oxide produced in the exhaust gases, and cooling the exhaust gases so as to further the oxidation of the nitric oxide to nitrogen dioxide.

Reference has been made to the fact that nitrogen dioxide when dissolved in water forms nitric acid. It is, of course, well known that $NO_2$, when added to water in small quantities, forms both nitric and nitrous acids. As the concentration of the $NO_2$ in the water increases, the equilibrium shifts to favor nitric acid. Thus, in the specification, when reference is made to nitric acid, the above equilibrium is understood as occurring. Such equilibrium compounds do not, of course, detract from the merit of my invention since both compounds have valuable fertilizing properties.

I claim:

1. The method of promoting vegetable growth which includes burning fuel in the presence of heated air in an internal combustion engine, using said engine to pump irrigation water, mixing the engine exhaust gas with an additional supply of air in the presence of a stream of irrigation water in finely divided condition whereby there is an intimate contact between the gases and the water, discharging the gas to the atmosphere and supplying the water as irrigation water for the land.

2. The method of recovering nitrogenous compounds which includes burning fuel in the presence of heated air in an internal combustion engine, using said engine to pump water, mixing the engine exhaust gas with an additional supply of air in the presence of a large volume of water in finely divided condition whereby there is an intimate contact between the gases and the water, discharging the gas to the atmosphere and recovering the resultant nitrogenous compounds from solution in the water.

3. The method of promoting vegetable growth which includes burning hydrocarbon fuel in heated air to generate power to pump irrigation water, causing the products of combustion, additional air, and the irrigation water, the water being in finely divided condition, to contact one another until the nitric oxide in the exhaust gases is oxidized by the oxygen in the air to nitrogen dioxide, the nitrogen dioxide going into solution in the water and forming a weak solution of nitric acid, discharging the irrigation water on the land in contact with the vegetable growth.

4. The method of recovering nitrogenous compounds which includes burning hydrocarbon fuel in heated air to generate power to pump water, causing the products of combustion from the engine, additional air, and the pump water, the water being in a finely divided state, to mix with one another until the nitric oxide in the exhaust gas is oxidized by the oxygen in the gas and from the air to nitrogen dioxide, the nitrogen dioxide going into solution in the water and forming a weak solution of nitric acid, and discharging the water for further use as a dilute solution of nitric acid.

5. The method of recovering nitrogen compounds for crop enrichment which consists in pumping irrigation water by an internal combustion engine, the engine being timed to complete combustion just before upper dead center, the air to support said combustion being heated by heat exchange with the exhaust gas to a temperature just below the temperature at which pre-ignition occurs, the exhaust gas being used to induct an additional supply of air into a mixing chamber, after which the mixed exhaust gas and air are exposed at low temperatures for an extended period of time to surfaces under agitation and spray conditions by a body of water pumped by the engine.

6. The method of recovering nitrogen compounds which includes pumping water by an internal combustion engine, preheating the air to support combustion in the engine, using the exhaust gas from the engine to induct an additional supply of air into a mixing chamber, after which the mixed exhaust gas and air are exposed to a finely divided water spray in the chamber, discharging the water after such exposure to the exhaust gases and air for further disposal.

7. The method of recovering nitrogen compounds consisting of the steps of pumping water by an internal combustion engine, heating the air to support combustion, by passing it in heat exchange relationship with the exhaust gas, mixing the exhaust gas and additional air in a chamber wherein the mixed gases are exposed to a fine water spray, the water then being discharged from the chamber and the gas being discharged to the atmosphere.

8. The method of promoting vegetable growth which includes burning hydrocarbon fuel in heated air to generate power to pump irrigation water, the products of combustion including nitric oxide, cooling the products of combustion including the nitric oxide by placing it in heat exchange relationship with ambient air, causing the products of combustion, additional air, and the pumped irrigation water to contact one another in a nitrogen recovery zone until the nitric oxide in the exhaust gases is oxidized to nitrogen dioxide, the nitrogen dioxide then going into the water as a weak solution of nitric acid, the irrigation water containing the weak solution of nitric acid going onto the land and contacting vegetable growth.

9. The method of promoting vegetable growth which includes burning hydrocarbon fuel in air to generate power to pump irrigation water, the products of combustion including nitric oxide, preheating the air to support combustion by placing it in heat exchange relationship with the exhaust gas, cooling the products of combustion including the nitric oxide by means of said heat exchange relationship, causing the products of combustion, additional air, and the pumped irrigation water to contact one another in a nitrogen recovery zone wherein the nitric oxide in the exhaust gases is oxidized to nitrogen dioxide, the nitrogen dioxide then going into the water as a weak solution of nitric acid, the irrigation water containing the nitric acid going into the land and contacting the vegetable growth.

10. A method of promoting vegetable growth including burning fuel in an internal combustion engine, mixing the engine exhaust gas under pressure with an additional supply of air under pressure in the presence of a stream of irrigation water whereby there is an intimate contact between the gases and the water, discharging the gas to the atmosphere and supplying the water to the land.

References Cited in the file of this patent

UNITED STATES PATENTS

| 961,350 | Hausser | June 14, 1910 |
| 1,121,722 | Fessenden | Dec. 22, 1914 |
| 1,122,923 | Heine | Dec. 29, 1914 |
| 2,028,172 | Sweek | Jan. 21, 1936 |
| 2,088,869 | Porter | Aug. 3, 1937 |

FOREIGN PATENTS

| 104,734 | Great Britain | Mar. 15, 1917 |

OTHER REFERENCES

Publication: "Internal Combustion Engines" (Lichty), sixth edition, published 1951 by McGraw-Hill (N.Y.), pages 276 and 277 relied on.